United States Patent [19]
Brown

[11] Patent Number: 5,452,617
[45] Date of Patent: Sep. 26, 1995

[54] TOOL FOR MEASURING FORCE NEEDED TO OPERATE RAILROAD TRACK SWITCHES

[76] Inventor: James E. Brown, Jr., 16608 San Pedro, Ste. 321, San Antonio, Tex. 78232

[21] Appl. No.: 267,673

[22] Filed: Jun. 29, 1994

Related U.S. Application Data

[63] Continuation-in-part of Ser. No. 17,639, Feb. 12, 1993, abandoned.

[51] Int. Cl.[6] .................................................. G01L 3/02
[52] U.S. Cl. ................................... 73/862.23; 73/862.26
[58] Field of Search ........................... 73/862.23, 862.26, 73/862.321, 862.191, 862.637, 862.639; 81/467, 477, 478, 481

[56] References Cited

U.S. PATENT DOCUMENTS

| | | | |
|---|---|---|---|
| 2,128,991 | 9/1938 | Eighmey | 73/862.26 |
| 3,726,135 | 4/1973 | Vuceta | 73/862.26 |
| 4,641,538 | 2/1987 | Heyraud | 73/862.26 |

*Primary Examiner*—Richard E. Chilcot, Jr.
*Assistant Examiner*—Elizabeth L. Dougherty
*Attorney, Agent, or Firm*—Donald R. Comuzzi; Christopher L. Makay

[57] ABSTRACT

A tool measures the force required to move the handle of a railroad track switch between first and second positions that open and close the switch. The tool includes (1) an elongate tool handle; (2) a clamp for clamping the tool handle to the end of the switch handle so the longitudinal axis of the tool handle is parallel to the longitudinal axis of the switch handle and so the tool handle extends a predetermined distance from the switch handle; (3) a grip mounted on the tool handle a fixed distance from the end of the switch handle; and (4) a gauge mounted on the tool handle between the grip and the clamp to measure the maximum force exerted to throw the switch. Another embodiment provides a clamp which fits on standard torque wrenches and mounts on the handle of a railroad track switch to permit the measuring of the force required to open and close the railroad track switch.

7 Claims, 4 Drawing Sheets

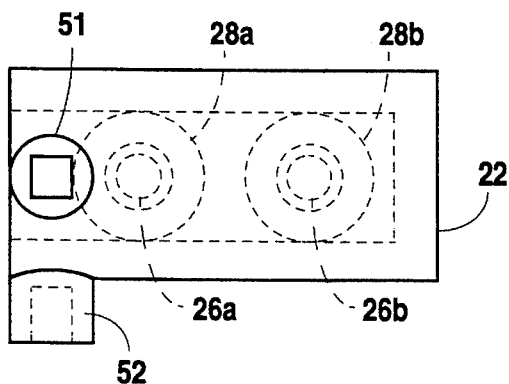
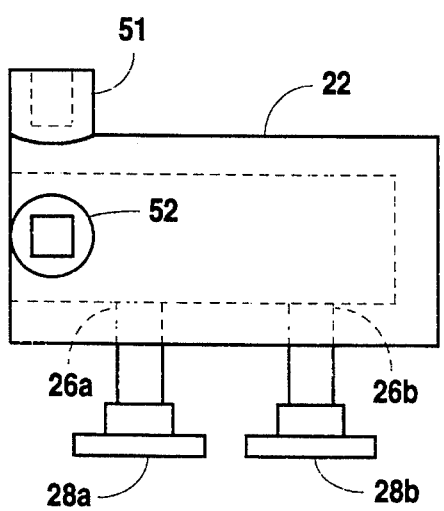
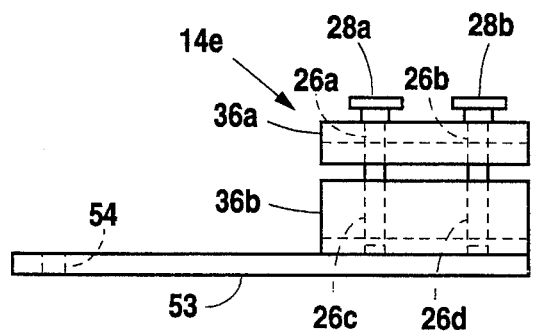
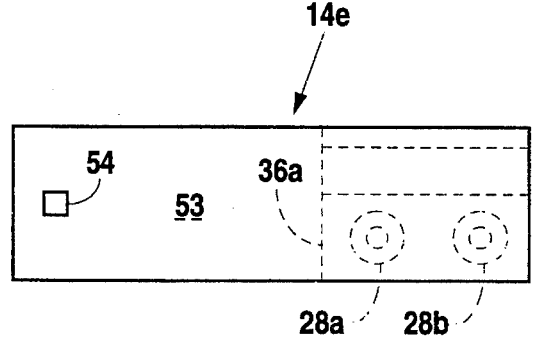
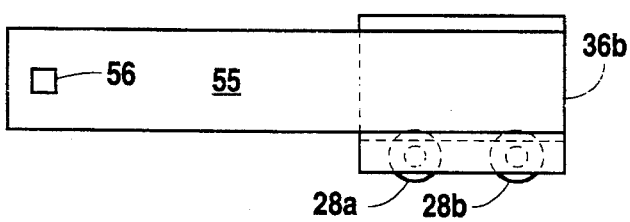
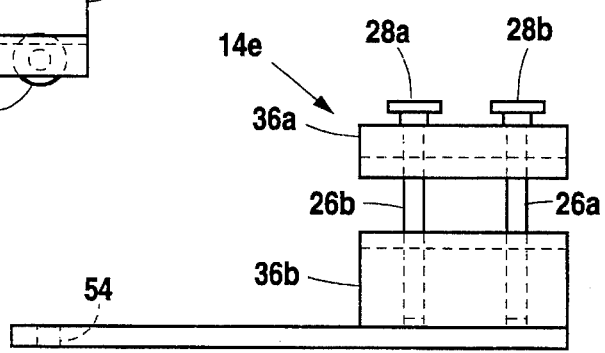

5,452,617

TOOL FOR MEASURING FORCE NEEDED TO OPERATE RAILROAD TRACK SWITCHES

This is continuation in part of my application Ser. No. 08/017,639 filed on Feb. 12, 1993 now abandoned, and also entitled "Tool for Measuring the Force Needed to Operate Railroad Track Switches".

BACKGROUND OF THE INVENTION

1. Field of the Invention

The invention relates to torque measuring tools generally, and in particular to a tool for measuring the amount of force exerted while operating the switch of a railroad track.

2. Description of the Prior Art

Track switching is a common activity of railroad operations. Of the various types of railroad switches, at least three are manually operated. Since both the tracks and the switches are routinely exposed to the weather, the switches can become difficult to operate due to rust or corrosion or from foreign matter buildup in the track beds.

The United States federal government strictly regulates most facets of railroad operations, but there are no regulations regarding the maintenance or operation of track switches except to the extent that they effectively switch tracks. Thus, there are no federal regulations regarding the maximum amount of force applied through a fixed moment arm that is necessary to operate the switches. Manual switches and associated tracks having excessive rust, corrosion, or foreign matter buildup therefore represent a substantial injury risk to the switch operator caused by unanticipated increase in the force required to throw a switch. Injuries are typically to the lower back and can range from sprains to breaks. One reason for the lack of governmental regulation is that no tool has ever been developed to measure the force exerted in throwing a switch without which regulations regarding the maximum force to be used cannot be developed.

It is therefore an object of this invention to provide a tool for measuring the amount of force necessary to operate railroad track switches when applied through a predetermined movement arm. This tool will allow federal regulatory bodies to promulgate and enforce regulations regarding maintenance and testing of railroad switches. In turn, such regulations will ensure the safe and effective operation of railroad switches to eliminate unnecessary injury to railroad workers.

SUMMARY OF THE INVENTION

In accordance with the present invention, a tool measures the force required to move the handle of a railroad track switch between first and second positions that open and close the switch. The tool includes (1) an elongate tool handle; (2) means for clamping the tool handle to the end of the switch handle so the longitudinal axis of the tool handle is parallel to the longitudinal axis of the switch handle and so the tool handle extends a predetermined distance from the switch handle; (3) a grip mounted on the tool handle a fixed distance from the end of the clamping means; and (4) a gauge mounted on the tool handle between the grip and the mounting means to measure the maximum force exerted to throw the switch. Another embodiment of the present invention provides a clamp which fits standard torque wrenches and mounts to the handle of a railroad track switch to permit the measuring of the force required to open and close the railroad track switch.

BRIEF DESCRIPTION OF THE DRAWINGS

Other objects, advantages, and features of this invention will be apparent to a person skilled in the art from a consideration of this specification including the appended claims and attached drawings.

In the Drawings

FIG. 10 is a top view of a fourth embodiment of the invention;

FIG. 11 is a side view of the embodiment of FIG. 10;

FIG. 12 is a top view of a fifth embodiment of the invention;

FIG. 13 is a side view of the embodiment of FIG. 12;

FIG. 14 is a top view of a sixth embodiment of the invention; and

FIG. 15 is a side view of the embodiment of FIG. 14.

DESCRIPTION OF THE PREFERRED EMBODIMENTS

Figure 1:
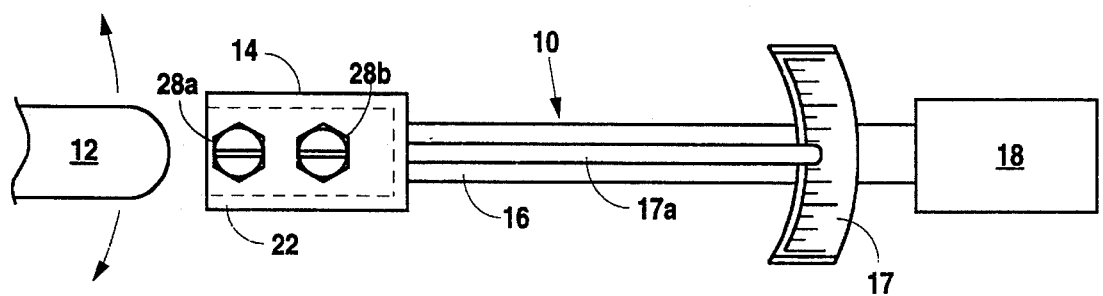
FIG. 1 is a top view of a first embodiment of the invention.
Figure 2:
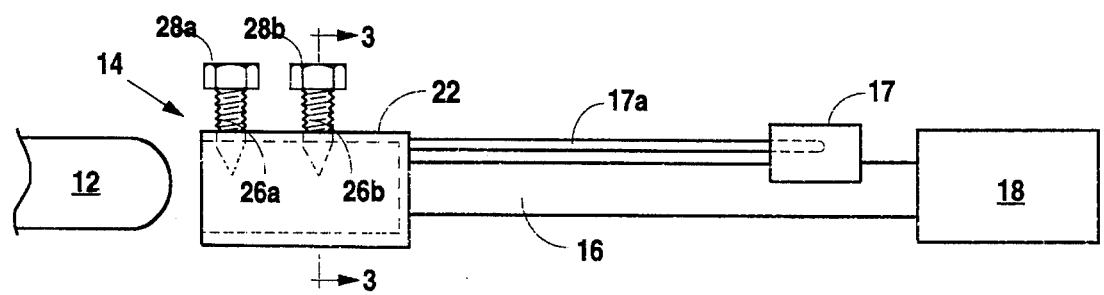
FIG. 2 is a side view of the embodiment in FIG. 1.
Figure 3:
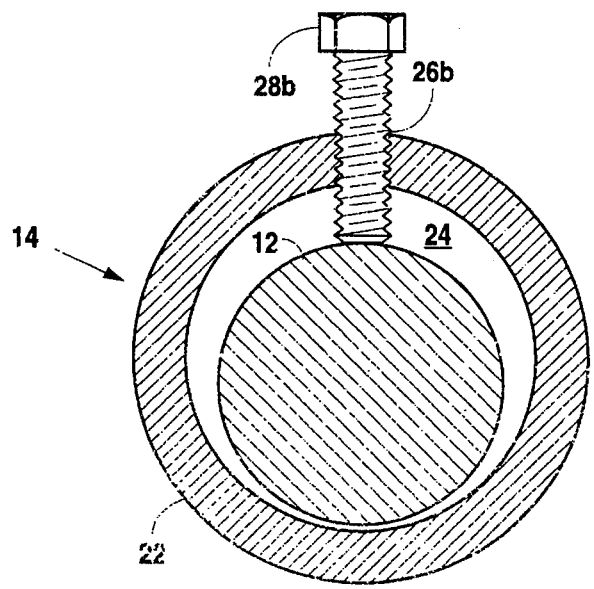
FIG. 3 is a sectional view taken along line 3—3 of FIG. 2.

A first embodiment of the invention, generally denoted 10, is illustrated in FIGS. 1–3. Tool 10 is especially adapted for switches having handles that are round in cross section such as switch handle 12. The handle is moved in the direction of the arrows to throw the switch. Clamp 14a is provided at one end of tool 10 to attach tool 10 to switch handle 12 with the longitudinal axis of handle 12 of tool 10 parallel to the longitudinal axis of switch handle 12.

Clamp 14a is affixed to tool handle 16 by welding or some other suitable method and includes substantially cylindrically shaped body 22 having eccentric bore 24 extending therethrough to receive handle 12, as shown in FIG. 3. Body 22 also has slot 25 in the wall thereof intersecting bore 24 and extending the length thereof (best shown in FIG. 3 and shown in ghosted lines in FIG. 1). Body 22 furthermore has threaded openings 26a–b (shown in FIG. 3 and in ghosted lines in FIG. 2) opposite slot 25.

Set screws 28a–b engage switch handle 12 through threaded openings 26a–b when switch handle 12 is extended into blind bore 24. Theoretically, only one set screw is necessary to practice the invention, but two set screws is preferred. In the first embodiment, the longitudinal axis of blind bore 24 is offset relative to the longitudinal axis of body 22 in the direction of slot 25 so that the wall of body 22 is thickest at the point opposite slot 25 and tapers toward slot 25 as shown in FIG. 3. The offset in combination with slot 25 renders the wall of body 25 flexibly resilient to permit operation with a wider variety of switch handle diameters than would be possible without the offset. However, the offset is not necessary to the practice of the invention but is only a useful feature thereof.

Grip 18 is affixed to tool handle 16 at a fixed, predetermined distance from clamp 14a at the end of tool handle 16 opposite clamp 14a. Both grip 18 and tool handle 16 are generally round in cross-section in the preferred embodiment. Indicator 15 of gauge 17 is operably connected to clamp 14a by welding or some other suitable technique and gauge 17 is mounted to tool handle 16 at a fixed, predetermined distance between clamp 14a and grip 18 as shown in FIG. 1. The affixation of clamp 14a and grip 18 to tool handle 16 can be by any one of several methods well known to those in the art as can be the operable connection of gauge 17 to clamp 14a and the mounting of gauge 17 to tool handle 16.

In operation, clamp 14a is fitted over switch handle 12, switch handle 12 being inserted into blind bore 24 of body 22 as shown in cross-section in FIG. 3. Set screws 28a–b are then rotated to engage switch handle 12 and are tightened to ensure solid engagement. The longitudinal axis of tool handle 16 is parallel to the longitudinal axis of switch handle 12.

The user then grasps tool 10 by grip 18 and operates the switch as if grasping switch handle 12 directly. While operating the switch, the user monitors gauge 17 and notes the maximum deflection shown on gauge 17. Since grip 18 is located on tool handle 16 a known distance from clamp 14a and gauge 17 is located a known distance between grip 18 and clamp 14a, the deflection measured on gauge 17 is proportional to the force exerted on switch handle 12. Gauge 17, when properly calibrated, indicates the amount of force corresponding to a given deflection and the user can thereby determine the amount of force necessary to operate the switch.

Figure 4:
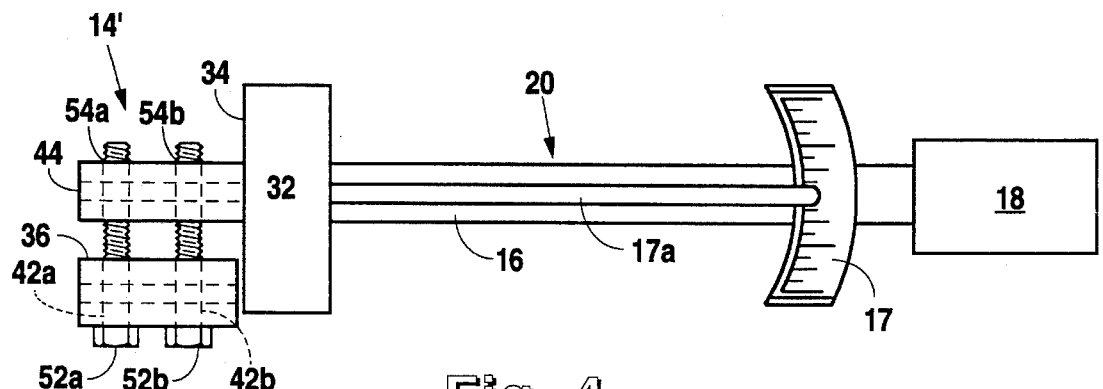
FIG. 4 is a top view of a second embodiment of the invention.
Figure 5:
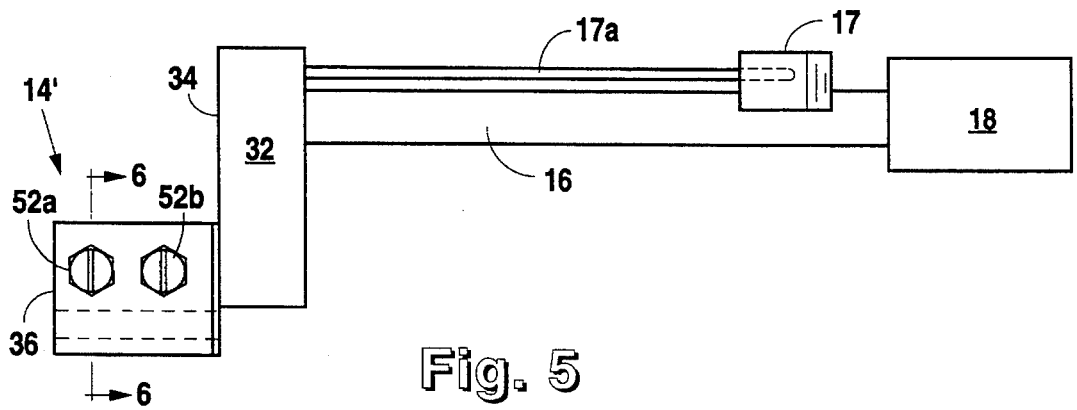
FIG. 5 is side view of the embodiment of FIG. 4.
Figure 6:
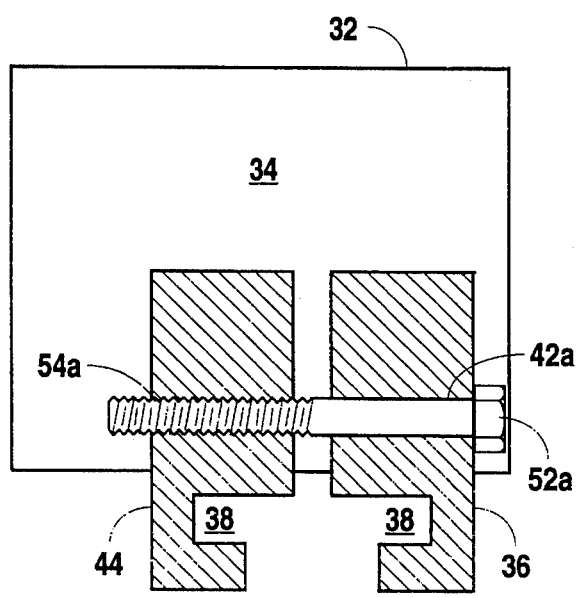
FIG. 6 is sectional view taken along line 6—6 of FIG. 5.

FIGS. 4–6 illustrate a second embodiment of the invention, generally denoted 20, substantially similar to tool 10 in many respects with like parts having like numbers. However, as is known in the art, some railroad switches do not terminate in rounded ends as is illustrated for switch 12 in FIGS. 1–2. These switches have handles that terminate in rather large counterweights, and so the clamp, or head, of the tool must have an alternative design.

Clamp 14b of tool 20 as shown in FIGS. 4–6 is adapted for clamping to such switch handles. Clamp 14b includes base 32 that is rectangular in cross section to provide flat surface 34. First clamping member 36a of clamp 14b is positioned perpendicularly relative to planar surface 34 in a manner described more fully below and has slot 38a extending the length thereof as best shown in FIG. 6 and in ghosted lines in FIG. 4. First clamping member 36a also has openings 26a–b which are substantially in parallel relationship with planar surface 34.

Second clamping member 36b is affixed to base 32 and has threaded openings 26c–d which are substantially coaligned with threaded openings 26a–b, respectively. Second clamping member 36b also has slot 38b extending the length of second clamping member 36b which is opposed to slot 38a of first clamping member 36a. Second clamping member 36b may, alternatively, be milled from a single piece of metal with base 32 to form a single piece.

Screws 28a–b extend through openings 26a–d in the manner shown in FIG. 4 to threadably engage both first and second clamping members 36a–b, and thereby position first clamping member 36a relative to both second clamping member 28b and surface 34 of base 32. The threaded engagement also provides control over the position of first clamping member 36a relative to second clamping member 28b and base 32 in a single plane as set forth below. Theoretically, only one of screws 28a–b is necessary to practice the invention, but two screws are generally preferred.

In operation, clamp 14b is fitted over the portion of the switch handle nearest the counterweight, the switch handle fitting into opposing slots 38a–b. First clamping member 36a moves in a substantially parallel direction relative to surface 34 of base 32 in response to rotation of screws 28a–b and, because screws 28a–b extend through openings 26a–d, in a direction substantially perpendicular to second clamping member 36b. Thus, clamp 14b clamps and releases the handle of the switch upon the clockwise and counterclockwise, respectively, rotation of screws 28a–b.

Screws 28a–b must be tightened sufficiently to ensure that the switch handle will be engaged by clamp 14b without slippage. To prevent slippage, the preferred embodiment illustrated in FIGS. 4–6 employs two screws to increase clamping efficiency even though one screw may be sufficient. Operations for measuring the force needed to operate the switch are substantially the same as those described above for tool 10 in FIGS. 1–3 once the switch handle is engaged by clamp 14b.

Figure 7:
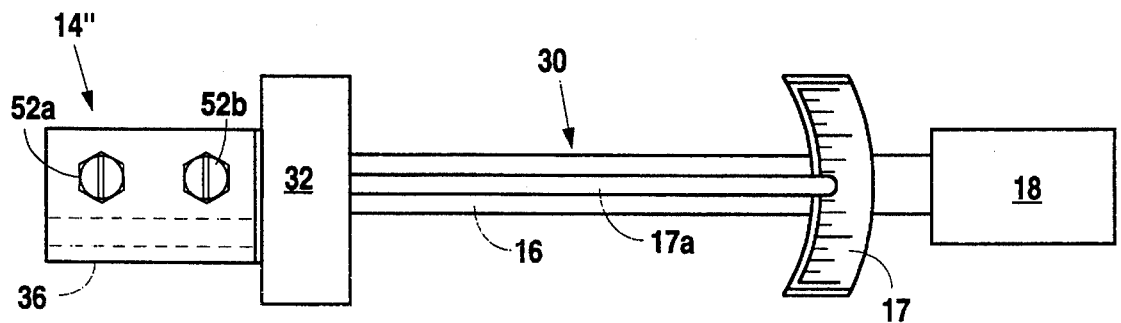
FIG. 7 is a top view of a third embodiment of the invention.
Figure 8:
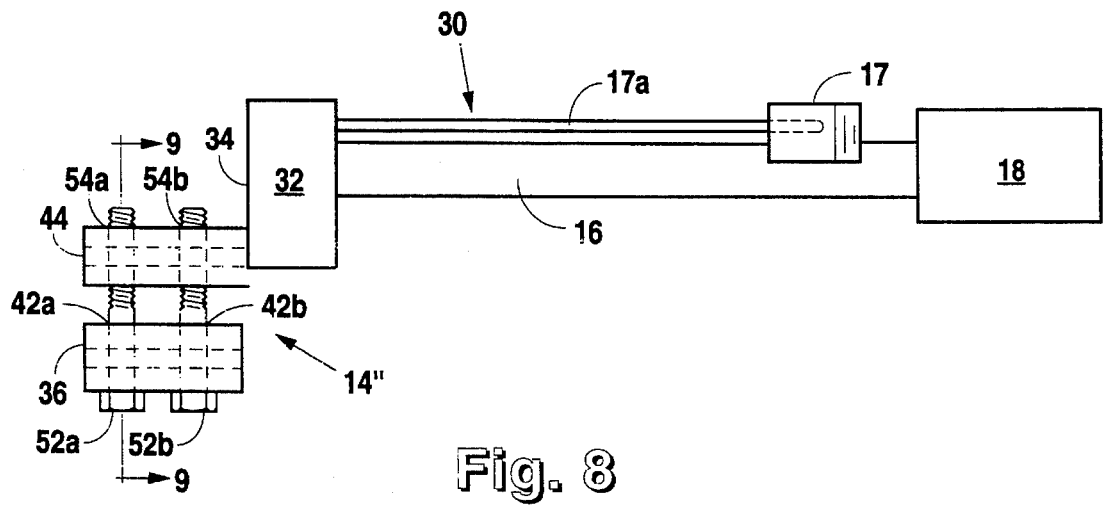
FIG. 8 is a side view of the embodiment in FIG. 7.
Figure 9:
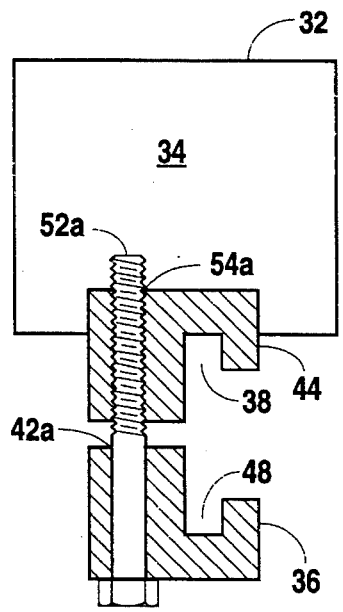
FIG. 9 is a sectional view taken along line 9—9 of FIG. 8.

Another alternative embodiment of the invention, generally denoted 30, is illustrated in FIGS. 7–9 with like parts having like numbers relative to other disclosed embodiments. The chief difference in tool 20 and tool 30 is that clamp 14c is rotated 90° relative to gauge 17 to facilitate a 90° change in the orientation relative to the switch handle found in some variations of switches whose handles terminate in counterweights. Tool 30 is otherwise structurally and functionally the same as tool 20.

Certain advantages can be had by manufacturing the clamp illustrated in FIGS. 1–9 for interchangeable use with standard "torque wrench" designs as illustrated in FIGS. 10–11, 12–13, and 14–15. There are commercially available torque wrenches usable with a variety of interchangeable pieces commonly referred to as sockets that are shaped to snugly fit over a variety of bolt heads and nuts having differing sizes and shapes. Although none of these sockets is suitable for use with railroad track switches and cannot be so modified, the wrenches can be employed with the alternative embodiments of the invention illustrated in FIGS. 10–11, 12–13, and 14–15.

As is well known to those of ordinary skill in the art, such standard torque wrenches have a grip, a shaft, and a gauge such as grip 18, shaft 16, and gauge 17 shown in FIGS. 1–9. The shaft of such wrenches typically terminates in a square plug which is snap-fitted into the square recess of the socket. Each of clamps 14a–c illustrated in FIGS. 1–9 is shown in FIGS. 10–11, 12–13, and 14–15 have been adapted for use with such a wrench.

Clamps 14d–f in FIGS. 10–11, 12–13, and 14–15 correspond to clamps 14a–c in FIGS. 1–9, respectively, with like parts having like numbers. Clamp 14d no longer permanently mounts to a handle and instead includes plug receivers 51 and 52, into which the square plug (not shown) of the torque wrench (also not shown) can be snap-fitted. Plug receivers 51 and 52 mount onto body 22 of clamp 14d using any suitable means such as welding. Clamp 14d includes both plug receivers 51 and 52 to permit the measurement of force along two separate axes after the placement of clamp 14d onto a switch handle.

Clamp 14e has been modified by removing base 32 and including base 53 which mounts to second clamping member 36b at a location different from base 32. Base 53 mounts onto second clamping member 36b using any suitable means such as welding. Base 53 includes square recess 54, into which the square plug (not shown) of the torque wrench (also not shown) can be snap-fitted.

Clamp 14f has been modified by removing base 32 and including base 55 which mounts to second clamping member 36b at a location different from base 32. Base 54 mounts onto second clamping member 36b using any suitable means such as welding. Base 54 includes square recess 55, into which the square plug (not shown) of the torque wrench (also not shown) can be snap-fitted. Notably, plug receivers 51 and 52 and square recesses 53 and 55 need not necessarily be square-shaped if the torque wrench plug is not square-shaped. The shape of plug receivers 51 and 52 and recesses 53 and 55 need only be sufficiently shaped to securely snap fit with the torque wrench plug.

It will be understood that certain features and subcombinations are of utility and may be employed without reference to other features and subcombinations. This is contemplated by and is within the scope of the claims. Because many possible embodiments may be made of the invention without departing from the scope thereof, it is to be understood that all matter herein set forth or shown in the accompanying drawings is to be interpreted as illustrative and not in a limiting sense.

What is claimed is:

1. A tool for throwing a railroad switch wherein the railroad switch includes a handle movable between a first position that opens the railroad switch and a second position that closes the railroad switch, said tool, comprising:

an elongated tool handle;

means connected at a first end of said elongated tool handle for clamping said elongated tool handle to the railroad switch handle; and a gauge mounted on said elongated tool handle to measure the torque required to move the railroad switch handle between its first and second positions.

2. The tool according to claim 1 wherein said means for clamping, comprises:

a body including a recessed portion that receives an end of the railroad switch handle; and a set screw extending through said body wherein said set screw engages the railroad switch handle to secure the railroad switch handle within said body.

3. The tool according to claim 1 further comprising a grip mounted to a second end of said elongated tool handle.

4. The tool according to claim 1 wherein said means for clamping removably connects to the first end of said elongated tool handle.

5. The tool according to claim 1 wherein said means for clamping, comprises:

a base;

a first clamping member including a slot extending the length thereof;

a second clamping member mounted on said base, said second clamping member including a slot extending the length thereof; and a screw connecting said first clamping member to said second clamping member with said slots of said first and second clamping members in substantial alignment to receive the railroad switch handle wherein the rotation of said screw in a first direction closes said first clamping member over said second clamping member to secure the railroad switch handle therebetween and the rotation of said screw in a second direction parts said first clamping member from said second clamping member to release the railroad switch handle.

6. A tool, utilized with a standard torque wrench that terminates in a plug for snap-fitting with other pieces, for throwing a railroad switch wherein the railroad switch includes a handle movable between a first position that opens the railroad switch and a second position that closes the railroad switch, said tool, comprising:

a body including a recessed portion that receives an end of the railroad switch handle and at least one receiver mounted on said body and adapted to engage the plug of the torque wrench; and a set screw extending through said body wherein said set screw engages the railroad switch handle to secure the railroad switch handle within said body.

7. A tool, utilized with a standard torque wrench that terminates in a plug for snap-fitting with other pieces, for throwing a railroad switch wherein the railroad switch includes a handle movable between a first position that opens the railroad switch and a second position that closes the railroad switch, said tool, comprising:

a base including a recess for receiving the plug of the torque wrench;

a first clamping member including a slot extending the length thereof;

a second clamping member mounted on said base, said second clamping member including a slot extending the length thereof; and a screw connecting said first clamping member to said second clamping member with said slots of said first and second clamping members in substantial alignment to receive the railroad switch handle wherein the rotation of said screw in a first direction closes said first clamping member over said second clamping member to secure the railroad switch handle therebetween and the rotation of said screw in a second direction parts said first clamping member from said second clamping member to release the railroad switch handle.

* * * * *